Nov. 7, 1933.          A. W. KEUFFEL          1,934,232
SLIDE RULE
Filed Feb. 11, 1932
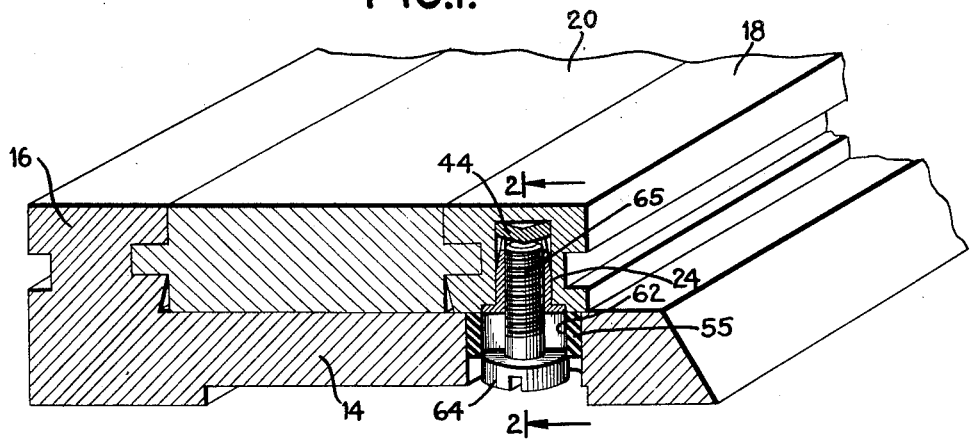
INVENTOR-
ADOLF W. KEUFFEL
BY Bahleber + Ledbetter
ATTORNEYS Patented Nov. 7, 1933

1,934,232

UNITED STATES PATENT OFFICE 1,934,232

SLIDE RULE

Adolf W. Keuffel, Montclair, N. J., assignor to Keuffel & Esser Co., Hoboken, N. J., a corporation of New Jersey Application February 11, 1932. Serial No. 592,275

20 Claims. (Cl. 235—70)

This invention relates to slide rules and more particularly to a method of and means whereby the component elements of slide rules may be secured together.

Slide rules, particularly of the Mannheim type, have heretofore been made with one rule member or side bar removably secured to another rule member, say the body portion of the rule, with provision for adjustment. Thus wear between the slide and the relatively stationary portions of the rule and changes in dimensions due to atmospheric conditions are compensated. The adjustment has heretofore been attained by screws movable in slots in one of the rule members threaded into another of the rule members. Since the rule members are of a relatively softer material than the securing devices, a destruction of the rule members has frequently resulted, particularly where the adjustment has been attempted by unskilled persons. It has frequently occurred, in endeavoring to secure the slide rule members together, after an adjustment, that the screw has been turned into the wood of the side bar so much more than was necessary that the female threads in the material of the side bar have been destroyed and the sides of the slot in the body of the rule has been crushed by the strain placed thereon by the head of the securing screw.

An object of the present invention is the provision of securing means for the component elements of a slide rule which shall resist any force tending to separate the parts.

Another object of the invention is the provision of securing means which shall itself take up the stresses and the forces of compression exerted by and upon the securing means in drawing the parts of the slide rule together.

The invention also seeks securing means which shall be wear-resistant and which shall protect the component parts of the slide rule from wear.

A further object of the invention is the provision of securing means by which the slide rule members are, in effect, clamped together.

It is also an object of the invention to provide securing devices for the component parts of slide rules which, in use, shall become more firmly fixed in place.

Still another object of the invention is the provision of securing means for slide rules which shall be self contained.

The invention further seeks a slide rule which shall be practical from the standpoint of ease and cheapness of manufacture and convenience and durability in use.

In accordance with the invention, a female member is adapted to be firmly anchored in one of the component members of the slide rule, say, the adjustable side bar and receives a male member, such as a screw, holding or clamping another slide rule member to the first named member. More particularly, a bushing of wear-resistant material, such as metal, for instance brass, is anchored in the side bar of the slide rule. This bushing is preferably expansible, at least in part, so that portions thereof may be forced into the material of the side bar to anchor it in position. The screw passes through and preferably bears upon a bushing, fitted into the body of the slide rule and also formed of wear-resistant material, such as either a metal or a molded composition having the characteristics, say, of a synthetic resinoid like "bakelite". This bushing is preferably so disposed in the slide rule member as to bear against the female member and thus transmit all thrust of the screw to the female member.

These and other objects of the invention and the means for their attainment will be more apparent from the following detailed description, taken in connection with the accompanying drawing illustrating embodiments by which the invention may be realized, and in which:

Figure 1 is a view, partly in perspective, and partly in section, showing the invention applied to a Mannheim type slide rule, with the component elements of the securing means in section.

Figure 2 is a view, in section, showing the securing means anchored in the slide rule, and taken in the plane indicated by the line 2—2 of Figure 1 and looking in the direction of the arrows.

Figure 3 is a plan view looking from below, in the direction of the arrows 3—3 of Figure 2, and showing the screw and bushing in the slide rule body.

Figure 4 is a detail view, in section, taken on the line 4—4 of Figure 2 and showing the means provided to prevent the female member turning in the side bar under torque produced by the screw.

Figure 5 is a fragmentary view, in horizontal section through the side bar, in the plane indicated by the line 5—5 of Figure 2, and looking in the direction of the arrows to show the face of a conical thrust member by which the female member is expanded into the material of the side bar.

Figure 6 is a view in vertical section through the slide rule side bar showing in elevation, the thrust member in position and the female member partly withdrawn from place, parts of the female member being broken away to show details of construction.

Figure 7 is a view illustrating the female member in side elevation, looking from the left in Figure 6, and showing truncated portions whereby the expansibility of the sleeve is attained.

Figure 8 is a view showing, in perspective, the expansible end of the female member provided with slots.

Figure 9 is a view similar to Figure 8 but showing a different arrangement of slots.

Figure 10 is a view showing the slotted bushing in plan with the screw passing therethrough and taken in the plane indicated by the line 10—10 of Figure 2 looking in the direction of the arrows.

Figure 11 is a view showing the slotted bushing in perspective.

While the invention is shown as applied to a slide rule of the Mannheim type, it is to be understood that it is equally applicable in any situation where securing means are required to attain the objects recited.

In Figure 1, the body portion of a Mannheim type slide rule is indicated at 14 having an integral side bar portion 16 and an adjustable and removable side bar member 18, between which side bars 16 and 18 the usual slide 20 reciprocates. Neither the cooperating scales on the faces of the side bars and slide nor the courser or runner are illustrated since these form no part of the present invention. The side bar 18 is made adjustable toward and away from the fixed side bar 16 so as to compensate for wear of the parts and changes in dimensions due to atmospheric conditions, as is well understood in the art.

In the illustrated embodiment the side bar 18 is removably and adjustably secured to the body portion of the rule by fittings forming securing means therebetween. One such fitting is shown in Figure 1, but it will be obvious that the number of fittings utilized will depend upon circumstance. The description of one fitting will suffice.

In a downwardly facing recess 22, preferably cylindrical, in the side bar 18 is disposed an expansible female member 24—42 comprising generally a tubular portion 24 substantially snugly fitting the recess 22 and having a bore 26. The tubular part 24 is preferably circular in cross-section and is formed with internal threads 28. At its lower end the tubular part 24 is provided with an outwardly directed flange 30 to be received in the recess 32 of larger diameter in the lower face of the side bar 18. The flange 30 has one or more radially projecting fingers or teeth 34 received within recesses 36 opening outwardly from the recess 32 in the side bar and serving to prevent the female member 24—42 from rotating on its axis when set within the recess 22. The sleeve 24 is so made as to be expansible in order that portions thereof may be deflected or distorted into the material of the slide rule and be held fast therein and prevented from withdrawal. To this end, in the illustrated embodiment, spaced portions of the sleeve 24 are weakened. In the modifications of Figures 6 and 7, on substantially diametrically opposite sides of the inner end of the female member, the side of the sleeve is cut off in a plane downwardly and outwardly directed at an angle to the axis of the sleeve, or truncated, as on the line 38. The planes indicated by the line 38 intersect the bore 26 so as to cut away the wall completely, at spaced points, like slots, and the wall portions below these cut away portions are relatively thin so as to permit the wall portions 39 therebetween to be displaced or distorted into the material of the slide rule by wedging means next to be described. The displaceable wall portions are conveniently, although not necessarily, formed with cooperating wedge member bearing surfaces. As shown, the inner portion of the end 40 of the sleeve 24 is bevelled, as at 42.

In the innermost part of the recess 22 is disposed a sleeve expanding member 44 comprising a circular thrust receiving button of hard material having a wedging surface illustrated as a conical surface 46 adapted to cooperate with the surface 42 on the sleeve 24. This button 44 is conveniently made by stamping a round disc of steel or other hard material into a conical surface, as shown in section in Figure 2.

In lieu of truncating the sleeve 24 to form the weakened areas, the female member may be slotted at two or more places, as shown at 48 in Figures 8 and 9, by cuts in longitudinally extending planes.

The body portion 14 of the slide rule is formed with a passage 50—52 in register with the recess 22. This passage is conveniently of two different diameters in one direction and substantially the same or constant dimension in a direction at right angles thereto. As viewed in Figure 2 the uppermost portion of lesser diameter is indicated by the numeral 50 and the lowermost portion of relatively greater dimension in one direction is indicated by the numeral 52. These two portions define between them a bearing surface 51. The shape of the passage is best illustrated by viewing the outward shape of the slotted bushing 55 shown in Figure 11, which bushing the recess receives. The bushing may be described as having been formed originally from a slotted cylindrical member. The lower part 54 of the bushing is circular, but the upper part 56 is formed by rabbeting diametrically opposite portions to define plane side walls 58, preferably parallel, and plane top surfaces 60. The bushing is formed with an elongated slot 62, the major axis of which is parallel to the side walls 58. This bushing may be made of any wear resistant material, but is conveniently moulded of some such material as for instance, a synthetic resinoid like "bakelite". The inner surface of the passage is so shaped as to receive the bushing. When the bushing is set within the passage it is preferably disposed well within the lowermost end so as to afford a space 53 for the slotted head 64 of a screw holding the parts of the slide rule together. The portion 56 of the bushing extends through the passage and its outer surface 57 is flush with the upper surface of the body portion 14 of the slide rule. The surfaces 60 of the disc-like portion of the bushing bear against the bearing surface 51 of the passage.

The securing means is assembled in the component parts of the slide rule in the following manner: The wedge-like thrust button 44 is first placed within the recess 22 in the side bar with its conical wedging surface toward the mouth of the recess. The female member 24 is then forced into the recess 22 and against the cooperating wedge member 44. As the inclined surfaces 42 are forced against the wedge 46 the displaceable or distortable portions 39 or 49 are separated by virtue of the weakened wall portions therebetween and are displaced into the material of the side bar as shown in Figure 2. These parts 39 thus serve as anchoring means firmly holding the female member within the side bar and resisting forces tending to pull the female member out of the recess. The slotted bushing 55 fits snugly in the passage. The screw 64—65 is then passed through the slotted bushing 55 and the shank 65 threaded into the threaded bore 28 of the female member, the screw head 64 lying within the recess 53.

To adjust the side bar 18 with respect to the slide rule body 14, screw or screws 64—65 are, of course, first loosened in the female member or members 24. After the side bar 18 is adjusted to the desired position, it is fixed in such position by tightening screw or screws 64—65. It will be observed upon inspection of Figure 2 that the head 64 bears against the bushing 55, the bushing, in turn, bearing directly on the flange 30 of female member 24. Hence, no matter how firmly the screw 64—65 is turned home, the thrust is taken entirely by the female member. The side walls 58 of the bushing 55 hold the bushing against rotation and the fingers 34 prevent the female member 24 from rotating under the torque of the screw. The body 14 of the slide rule may thus be said to be clamped between the flanges 54—60 and the side bar 18 and thus the side bar is firmly held in position without strain on the material of the slide rule or damage thereto.

While the female member has been shown as located in the side bar, it will be apparent that the position of the parts may be reversed and the female member disposed in the body of the rule. The number of the securing means may depend upon the requirements of the particular slide rule. Other anchoring means for the screw, such as the common expansion bolt, may be resorted to.

Various modifications will occur to those skilled in the art in the composition, configuration and disposition of the component elements going to make up the invention as a whole, as well as in the type of slide rule or other instrumentality to which the invention is applied, and no limitation is intended by the phraseology of the foregoing description or illustrations in the accompanying drawing except as indicated in the appended claims.

What is claimed is:

1. Securing means between separable parts comprising a wear resistant bushing disposed in one part, a cylindrical female member disposed in the other part whereof the end is formed with a plurality of slots and the portion between the slots is of reduced thickness, means passing through the bushing and engaging the female member and a disc deformed to have a conical surface for engagement by the slotted end to expand the female member into the material of the part.

2. Securing means between a first and second separable parts comprising a wear resistant bushing in the first part, having a face flush with the surface adjacent the second part, a threaded sleeve in the second part, a flange carried with the threaded sleeve and having a face flush with the surface adjacent the first part for contact with the bushing, and connecting means engaging the bushing and threaded into the sleeve whereby the separable parts are secured together with the flange and the bushing.

3. Securing means with provision for relative adjustment between a first and second separable parts comprising a wear resistant bushing in the first part having a face flush with the surface adjacent the second part and formed with an elongated slot, a threaded sleeve in the second part, a flange carried with the threaded sleeve and having a face flush with the surface adjacent the first part for contact with the bushing, and connecting means passing through the slot in the bushing and threaded into the sleeve whereby the separable parts are secured together in adjusted position with the flange and the bushing in contact.

4. In a slide rule having a body portion and a side bar adjustable with respect thereto, securing means therefor comprising, in combination, a cylindrical bushing of wear resistant material formed with an elongated slot, said bushing being rabbeted at diametrically opposite sides to form outwardly directed faces lying in planes parallel to the longitudinal plane including the major axis of the slot and diametrically disposed transversely extending flanges at the lower end of the bushing, said body portion being formed with a passage corresponding in shape to the external shape of the bushing but of greater depth, said bushing being disposed within the passage with its upper end substantially flush with the upper surface of the body portion, a female member comprising an internally threaded cylindrical sleeve formed at its lower end with a peripheral flange and at least one projection in the plane of the flange extending therefrom, the other end of said sleeve being cut away at spaced points and the inner edge of said end of the sleeve between the cut-away portions being bevelled, said side bar being formed with a correspondingly shaped recess in its lower side to receive the female member with its lower end substantially flush with the lower surface of the side bar, a circular disc formed with a conical lower surface disposed in the bottom of the recess to engage the bevelled end of the female member and distort the end portions into the material of the side bar and a screw passing freely through the slot in the bushing and in threaded engagement with the interior threads on the female member.

5. In a slide rule having a body portion and a side bar adjustable with respect thereto, securing means therefor comprising, in combination, a cylindrical bushing of wear resistant material formed with an elongated slot, said bushing being rabbeted at diametrically opposite sides to form outwardly directed faces lying in planes parallel to the longitudinal plane including the major axis of the slot and diametrically disposed transversely extending flanges at the lower end of the bushing, said body portion being formed with a passage corresponding in shape to the external shape of the bushing but of greater depth, a female member comprising an internally threaded cylindrical sleeve formed at its lower end with a peripheral flange and at least one finger in the plane of the flange extending therefrom, the other end of said sleeve being cut away at diametrically opposite sides in downwardly and outwardly directed planes intersecting the sleeve inwardly of the end thereof and the inner edges of said end of the sleeve between the cut-away portions being bevelled, said side bar being formed with a correspondingly shaped reces in its lower side to receive the female member, a circular disc formed with a conical lower surface disposed in the bottom of the recess to be engaged by the bevelled end of the female member and a screw passing freely through the slot in the bushing and in threaded engagement with the interior threads on the female member.

6. In a slide rule having a body portion and a side bar adjustable with respect thereto, securing means therefor comprising, in combination, a cylindrical bushing of wear resistant material formed with an elongated slot, said bushing being rabbeted at diametrically opposite sides to form outwardly directed faces lying in planes parallel to the longitudinal plane including the major axis of the slot and diametrically disposed transversely extending flanges at the lower end of the bushing, said body portion being formed with a passage corresponding in shape to the external shape of the bushing but of greater depth, a female member comprising a sleeve formed at its lower end with a peripheral flange, the other end of said sleeve being weakened, said side bar being formed with a correspondingly shaped recess in its lower side to receive the female member, a wedge member disposed in the bottom of the recess to be engaged by the end of the female member and securing means passing freely through the slot in the bushing and in engagement with the female member.

7. In a slide rule having a body portion and a side bar adjustable with respect thereto, securing means therefor comprising, in combination, a cylindrical bushing of wear resistant material formed with an elongated slot, said bushing being rabbeted at diametrically opposite sides to form outwardly directed faces lying in planes parallel to the longitudinal plane including the major axis of the slot and diametrically disposed transversely extending flanges at the lower end of the bushing, a female member comprising a sleeve formed with a flange, one end of said sleeve being weakened at spaced points, a wedge member disposed in the bottom of the recess to be engaged by the end of the female member and securing means passing freely through the slot in the bushing and in engagement with the female member.

8. In a slide rule having a body portion and a side bar adjustable with respect thereto, securing means therefor comprising, in combination, a cylindrical bushing of wear resistant material formed with an elongated slot, said bushing having at least one transversely extending flange, a female member comprising a sleeve formed at one end with a peripheral flange, one end of said sleeve being weakened at spaced points, a wedge member disposed in the bottom of the recess to be engaged by the end of the female member and securing means passing freely through the slot in the bushing and in engagement with the female member.

9. In a slide rule having a body portion and a side bar adjustable with respect thereto, securing means therefor comprising, in combination, a cylindrical bushing of wear resistant material formed with an elongated slot, said bushing being formed with at least one outwardly directed face lying in a plane parallel to the longitudinal plane including the major axis of the slot, a female member comprising a cylindrical sleeve formed with a peripheral flange, one end of said sleeve being weakened, a wedge member disposed in the bottom of the recess to be engaged by the end of the female member and securing means passing freely through the slot in the bushing and in engagement with the female member.

10. In a slide rule having a body portion and a side bar adjustable with respect thereto, securing means therefor comprising, in combination, a cylindrical bushing of wear resistant material formed with an elongated slot, said bushing being formed with at least one outwardly directed face lying in a plane parallel to the longitudinal axis of the slot and at least one transversely extending flange at the lower end of the bushing, a female member comprising a cylindrical sleeve formed with a peripheral flange, the other end of said sleeve being weakened, a wedge member disposed in the bottom of the recess to be engaged by the end of the female member and securing means passing freely through the slot in the bushing and in engagement with the female member.

11. In a slide rule having a body portion and a side bar portion adjustable with respect thereto, securing means therefor comprising, in combination, a cylindrical bushing of wear resistant material formed with an elongated slot, means to prevent said bushing rotating axially, means carried with the bushing to resist relative movement with respect to one slide rule portion in the axial direction of the bushing, said slide rule portion being formed with a passage corresponding in shape to the external shape of the bushing, a female member comprising a cylindrical sleeve, means carried with the female member to resist movement thereof with respect to another side rule portion, one end of said sleeve being weakened at spaced points, said another slide rule portion being formed with a correspondingly shaped recess in its lower side to receive the female member, wedge means disposed in the bottom of the recess to be engaged by the female member and securing means passing freely through the slot in the bushing and in engagement with the female member.

12. In a slide rule having a body portion and a side bar portion adjustable with respect thereto, securing means therefor comprising, in combination, a cylindrical bushing of wear resistant material formed with an elongated slot, means to prevent said bushing rotating axially, means carried with the bushing to resist relative movement with respect to one slide rule portion in the axial direction of the bushing, said slide rule portion being formed with a passage corresponding in shape to the external shape of the bushing, a female member comprising a cylindrical sleeve, means carried with the female member to resist movement thereof with respect to another slide rule portion, means to prevent the female member rotating axially, one end of said sleeve being weakened at spaced points, said another slide rule portion being formed with a correspondingly shaped recess in its lower side to receive the female member, wedge means disposed in the bottom of the recess to be engaged by the female member and securing means passing freely through the slot in the bushing and in engagement with the female member.

13. In a slide rule having a body portion and a side bar portion adjustable with respect thereto, securing means therefor comprising, in combination, a cylindrical bushing of wear resistant material formed with an elongated slot, means to prevent displacement of said bushing with respect to a slide rule portion, said slide rule portion being formed with a passage corresponding in shape to the external shape of the bushing but of greater depth, a female member comprising an internally threaded cylindrical sleeve formed at its lower end with a peripheral flange, the other end of said sleeve being cut away at diametrically opposite sides in downwardly and outwardly directed planes intersecting the sleeve inwardly of the end thereof and the inner edge of said end of the sleeve between the cut-away portions being bevelled, the other slide rule portion being formed with a correspondingly shaped recess in its lower side to receive the female member, wedge means disposed in the bottom of the recess to be engaged by the bevelled end of the female member and a screw passing freely through the slot in the bushing and in threaded engagement with the interior threads on the female member.

14. In a slide rule having a body portion and a side bar portion adjustable with respect thereto, securing means therefor comprising, in combination, a cylindrical bushing of wear resistant material formed with an elongated slot, means to prevent displacement of said bushing with respect to a slide rule portion, said slide rule portion being formed with a passage corresponding in shape to the external shape of the bushing but of greater depth, a female member comprising an internally threaded cylindrical sleeve formed at its lower end with a peripheral flange, the other end of said sleeve being weakened at spaced points and the inner edge of said end of the sleeve between the cut-away portions being bevelled, the other slide rule portion being formed with a correspondingly shaped recess in its lower side to receive the female member, wedge means disposed in the bottom of the recess to be engaged by the bevelled end of the female member and a screw passing freely through the slot in the bushing and in threaded engagement with the interior threads on the female member.

15. In a slide rule having a body portion and a side bar portion adjustable with respect thereto, securing means therefor comprising, in combination, a cylindrical bushing of wear resistant material formed with an elongated slot, means to prevent displacement of said bushing with respect to a slide rule portion, a female member comprising an internally threaded cylindrical sleeve formed with a flange, an end of said sleeve being weakened at spaced points, wedge means disposed in the bottom of the recess to be engaged by the end of the female member and a screw passing freely through the slot in the bushing and in threaded engagement with the interior threads on the female member.

16. In a slide rule having a body portion and a side bar portion adjustable with respect thereto, securing means therefor comprising, in combination, a cylindrical bushing of wear resistant material formed with an elongated slot, means to prevent displacement of said bushing with respect to a slide rule portion, a female member comprising an internally threaded cylindrical sleeve, an end of said sleeve being cut away at spaced points, the inner edge of said end of the sleeve being bevelled, wedge means disposed in the bottom of the recess to be engaged by the bevelled end of the female member and a screw passing freely through the slot in the bushing and in threaded engagement with the interior threads on the female member.

17. In a slide rule having a body portion and a side bar portion adjustable with respect thereto, securing means therefor comprising, in combination, a cylindrical bushing of wear resistant material formed with an elongated slot, means to prevent displacement of said bushing with respect to a slide rule portion, a female member comprising an internally threaded cylindrical sleeve, an end of said sleeve being cut away at spaced points, the inner edge of said end of the sleeve being bevelled, a circular disc formed with a conical lower surface disposed in the bottom of the recess to be engaged by the bevelled end of the female member and a screw passing freely through the slot in the bushing and in threaded engagement with the interior threads on the female member.

18. In a slide rule having a body portion and a side bar portion adjustable with respect thereto, securing means therefor comprising, in combination, a cylindrical bushing of wear resistant material formed with an elongated slot, a female member comprising an internally threaded cylindrical sleeve, means to prevent displacement of said sleeve with respect to the slide rule portion, an end of said sleeve being cut away at spaced points and the inner edge of said end of the sleeve between the cut-away portions being bevelled, a circular disc formed with a conical lower surface disposed in the bottom of the recess to be engaged by the bevelled end of the female member and a screw passing freely through the slot in the bushing and in threaded engagement with the interior threads on the female member.

19. Securing means between separable parts comprising a wear resistant bushing in one part, a female member disposed in the other part, means anchoring the female member in said part and means passing through the bushing and engaging the female member.

20. Securing means between separable parts comprising a clamping member in one part, a clamping member in the other part, means drawing the clamping members together, said clamping members having portions in engagement when the separable parts are secured together against displacement.

ADOLF W. KEUFFEL.